UNITED STATES PATENT OFFICE.

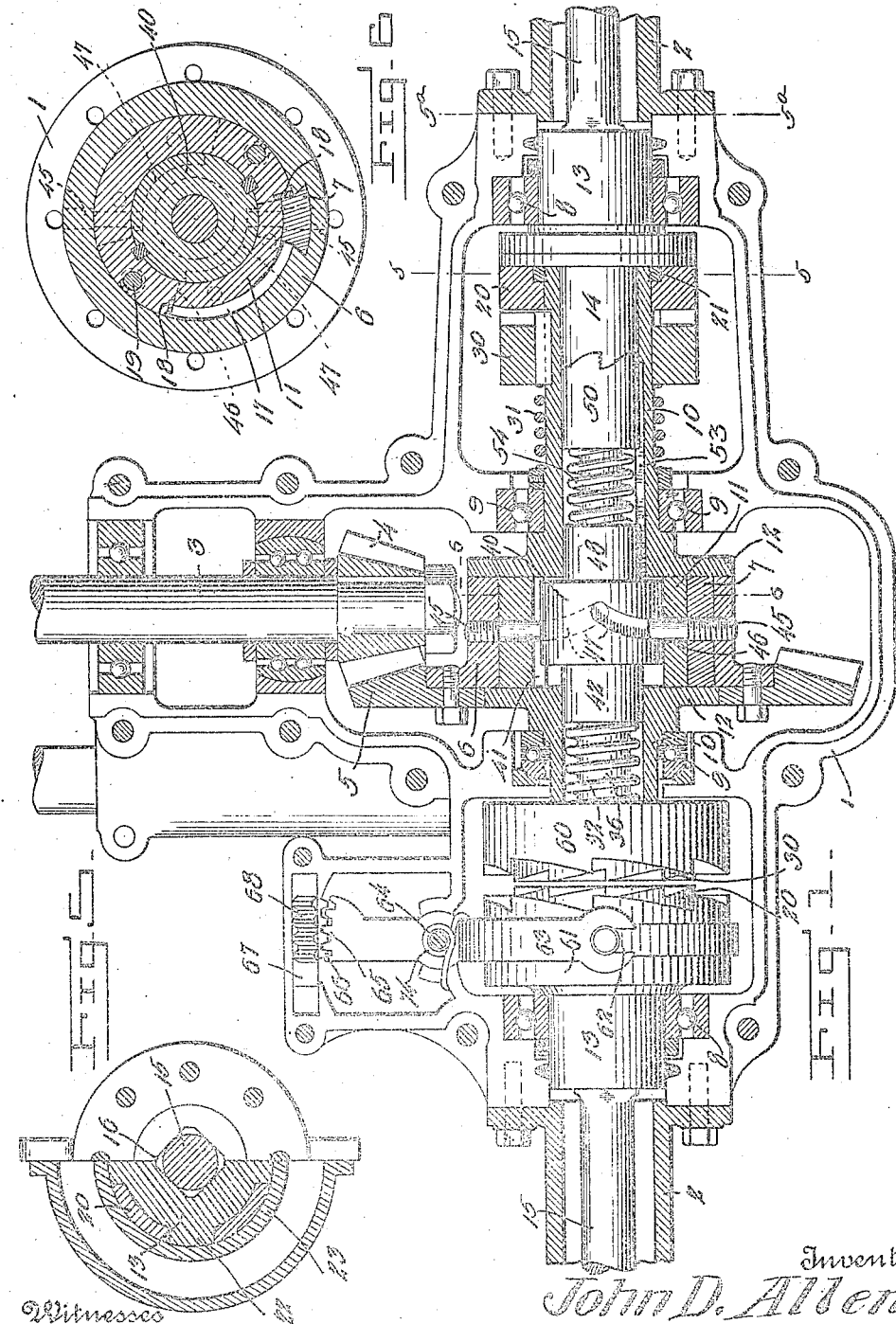

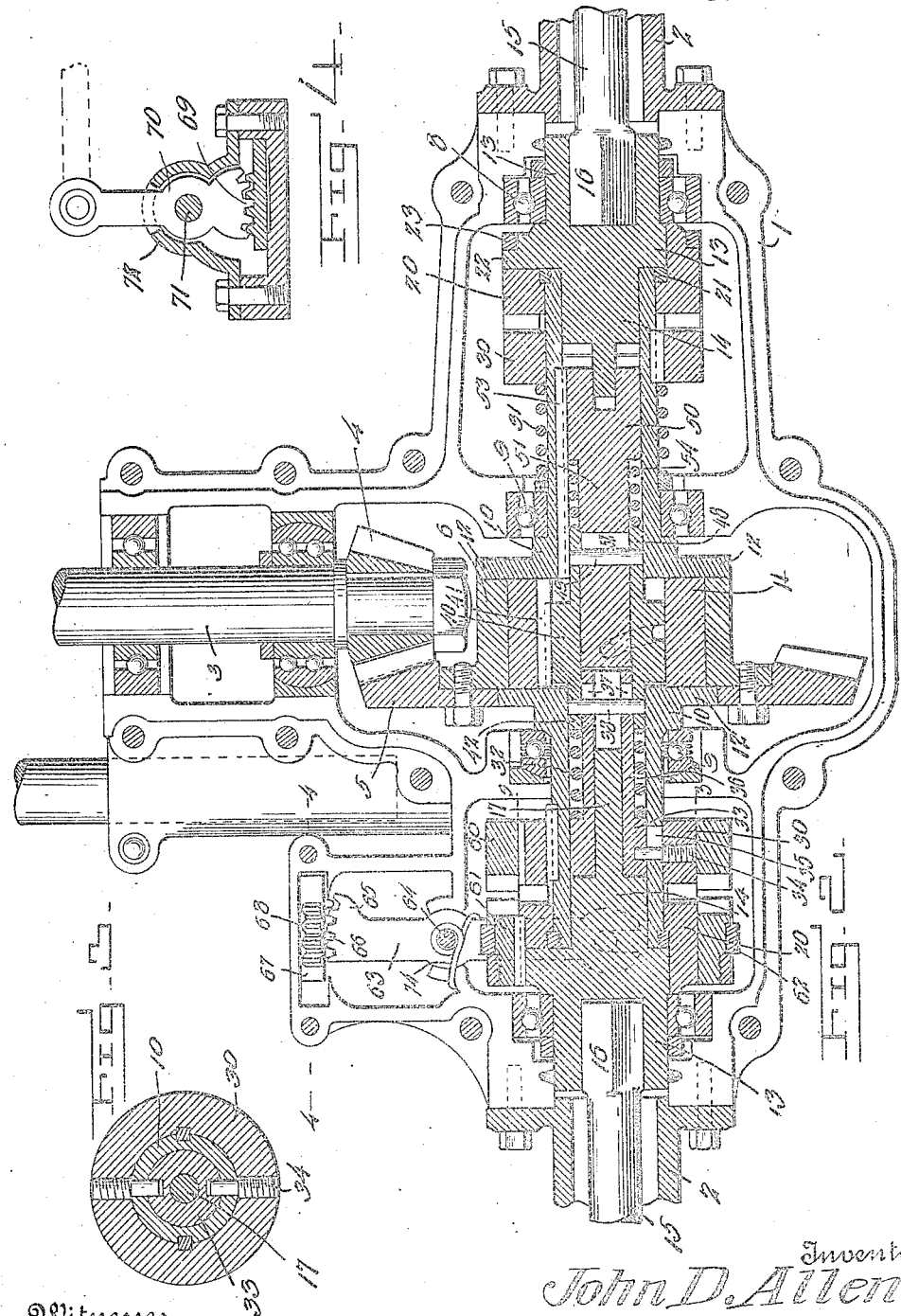

JOHN D. ALLEN, OF PHILADELPHIA, PENNSYLVANIA.

COMPENSATING DRIVING MECHANISM.

1,238,730.

Specification of Letters Patent.

Patented Sept. 4, 1917.

Application filed April 28, 1916. Serial No. 94,120.

*To all whom it may concern:*

Be it known that I, JOHN D. ALLEN, a citizen of the United States, residing at Philadelphia, in the county of Philadelphia and State of Pennsylvania, have invented new and useful Improvements in Compensating Driving Mechanism, of which the following is a specification.

My invention relates to the driving mechanism of motor vehicles and consists in a novel construction, or combination of means, which I term a "compensating driving mechanism," for transmitting the power to the wheels, whereby certain advantages are obtained, owing to the facts that:

It eliminates the ordinary "differential" and the friction and consequent loss of power occasioned thereby, while permitting a differential action of the wheels.

It provides for a positive drive of both wheels forward, while permitting the outer wheel to turn faster than the inner one on a curve.

It provides for automatically connecting at least one of the wheels to the power shaft when the latter is reversed, or when the power is cut off and the vehicle is coasting and, at the same time, for either entirely disconnecting one of the wheels from the power shaft, or—when both wheels drive on reverse—for enabling the outside wheel on a curve to turn faster than the inside one. It thus provides for automatically causing the vehicle to drive the motor as a compressor when it is traveling under its own momentum, whereby long grades can be descended without the use of the brakes, and the danger of loss of control is minimized, should the motor become stalled and the brakes fail to act when the vehicle is ascending a hill.

Broadly stated, the construction comprises a continuous hollow driving shaft journaled within the fixed hollow rear axle and connected to the wheel stub-shafts through overriding ratchet clutches, so that both wheels are positively driven forward but either one can turn faster in rounding a curve; said shaft carries the main driving gear mounted thereon in such a way that it can turn through a limited arc of a circle on said shaft, such turning movement serving to automatically throw into and out of engagement a reverse clutch, contained within the driving shaft, for connecting one of the wheels thereto for reverse drive, the overriding clutch of the other wheel being at the same time disengaged so that said wheel is free to turn either faster or slower than the other or driven wheel. In some cases, such as heavy motor-trucks, it is necessary or desirable to be able to drive both wheels on reverse and I have therefore provided an additional clutch, to be manually thrown into engagement by the operator, for connecting the otherwise free wheel to the shaft also on reverse drive. This additional clutch will not ordinarily be used on passenger cars.

This construction, hereinafter described in detail and shown in the drawings, makes it impossible to lock or drag either wheel, either on forward or backward drive, eliminates skidding and does away with friction losses caused by intermeshing gears. This application is a continuation in part of my application filed March 20, 1915 and allowed December 6, 1915, Serial No. 15838, which, in turn, is a continuation of my prior application, Ser. No. 813,577, filed January 21, 1914.

Figure 1 is a plan view, partly in section, of a driving mechanism embodying my invention, with the driving gear at one limit of its turning movement on the main shaft.

Fig. 2 is a similar view with all the driving mechanism shown in section, and with the driving gear at the other limit of its turning movement on the main shaft.

Fig. 3 is a cross-section on line 3—3 in Fig. 2.

Fig. 4 is a cross-section on line 4—4 in Fig. 2;

Fig. 5 is a cross-section half on line 5—5 and half on line 5ª—5ª in Fig. 1, and

Fig. 6 is a cross-section on line 6—6 in Fig. 1.

In these views, 1 represents the lower half of the inclosing casing which, with the tubular extensions 2, constitutes the rear axle of the vehicle. 3 represents the power-shaft, carrying bevel-pinion 4, which meshes with main driving gear 5, hub 6 of which is mounted so as to be capable of a limited turning movement on the central hollow portion 11 of the main driving shaft, which comprises said central portion 11 and the tubular portions 10, 10, having flanges 12, 12, between which 11 is securely held, as by bolts 19; said tubular portions being journaled in ball bearings 9, 9. The turning movement of gear 5 on the central portion 11 of the shaft is limited by the lug 7, carried by the hub 6 of the gear, striking against the shoulders 18, 18, at the ends of a peripheral groove 17, formed in said shaft portion 11. Cushioning means may be provided on said shoulders.

Heads 13, 13, journaled in ball bearings 8, 8, have reduced ends 14, 14, rotatably fitting in the ends of the shaft portions 10, 10, and have polygonal sockets in their outer ends to receive the similarly shaped ends 16, 16, of stub-shafts 15, 15, which are connected to the wheels, not shown.

Each head 13 has rigidly secured to it a ratchet clutch member 20, rotatably mounted on the end of sleeve or tubular portion 10, and held against outward longitudinal movement thereon by a collar 21, screwed on the end of said sleeve. The head may be secured to the clutch member in any convenient way, as by lugs 22 on the one fitting recesses in the other, (see Figs. 2 and 5), and being locked in assembled position by a screw-ring 23.

Conjugate clutch members 30, 30, are keyed to slide on shaft portions 10, 10, and are normally kept in engagement with clutch members 20, 20, by spring pressure. On the right-hand end of the shaft, as shown in these drawings, this pressure is afforded by a coil spring 31, surrounding the shaft 10, while at the left-hand end, the spring 32 is within the sleeve 10 and bears against a tubular member 33, which slides in shaft 10 and on the reduced extension 17 of the head 13 and which is rigidly secured to the clutch member 30 by pins 34, passed through slots 35 in shaft portion 10. A reduced extension 36 of tubular member 33 lies within spring 32 and is slidably mounted within the reduced end portion 42 of a cam sleeve 40, hereinafter described. The extension 36 is slotted at 37 for the passage of a pin 38, carried by said end portion 42, the purpose of which will be explained later.

Said cam sleeve 40 is mounted within the central portion 11 of the driving shaft, being slidably keyed thereto, as at 41. It is moved longitudinally therein by the said turning movement of the driving gear on the shaft, the connecting means consisting of two pins 45, carried by the hub 6 of said gear, passing through segmental slots 46, cut in through the periphery of shaft portion 11, in a plane at right angles to the axis and engaging with their ends in helical grooves 47, cut in the periphery of cam sleeve 40.

On the opposite side from said reduced end portion 42, sleeve 40 has a similar extension 48, carrying a pin 49, which passes through a slot 52, cut in the stem 51 of reverse clutch member 50 which is slidably keyed, as at 53, within shaft 10. A coil spring 54 is located around stem 51, and bears against extension 48 of sleeve 40 at one end and against the shoulder of clutch member 50 at the other.

The teeth of clutch member 50 are also ratchet teeth, (although they may be square when the additional reverse clutch—hereinafter described—for the other wheel is used) but face in the opposite direction to those of the clutches 30, and engage with opposed teeth formed on the end 14 of head 13, when sleeve 40 is moved to the right, thereby positively connecting said head and the driving shaft together for reverse drive. Spring 54 yields if the teeth of 50 strike the top of the teeth on 14, and serves to hold the clutch in engagement.

In operation the mechanism just described works as follows:

Under normal conditions of forward drive, the lug 7 of gear 5 is in contact with the forward shoulder 18 of the shaft center portion 11, and the sleeve 40 is held in its left-hand position. The ratchet clutches 20—30 are held in engagement by their springs, 31 or 32, and the wheels are driven thereby. When the vehicle travels in a curved path, the clutch member 20 of the wheel on the outside overrides its conjugate clutch member 30, the latter being forced back against its spring.

Now when the power-shaft 3 is reversed, gear 5 turns backwardly on 11 until the other side of lug 7 strikes the opposite shoulder 18. This turning movement of the gear on the shaft causes sleeve 40 to be cammed to the right, forcing—through spring 54— clutch member 50 into engagement with the teeth on 14, and pulling—through pin 38, tubular member 33—36 and pins 34—left-hand clutch member 30 out of engagement with its conjugate clutch member 20, thereby leaving the left hand wheel entirely free from the driving shaft, while the right-hand wheel is driven backwardly by the power shaft through clutch-members 50—14, at which time right-hand ratchet clutch 20—30 remains in engagement without having any effect whatsoever.

If the rearward travel is in a curved path the left-hand wheel is free to turn faster or slower than the driven wheel, according as to whether it is on the outside or the inside of the curve.

It will be evident that the action will be the same, (as when the power-shaft is reversed), whenever the momentum of the vehicle causes the wheels to drive the main shaft faster than the motor tends to drive it and that, therefore, the motor will act as a brake to hold the car in descending a hill, assuming, of course, that the transmission clutch is left in engagement.

In the case of heavy cars, such as motor trucks, it is desirable at times to be able to drive both wheels on reverse and, for that purpose, I have provided the following mechanism, whereby the left-hand wheel can also be connected to the shaft when its connection, through clutch 20—30, is broken, or is in the position illustrated in Fig. 1.

To accomplish this, I mount a clutch member 60 rigidly on clutch member 30, and slidably key a conjugate clutch member 61 on head 13 and clutch member 20. 61 can be thrown into engagement with 60 by a sliding ring and yoke connection 62, of common form, with a forked lever 63, pivoted at 64 in the casing 1, its outer arm having a toothed segment 65 on its ends, meshing with rack teeth 66, formed on a sliding bar 67, which also carries rack teeth 68 on its upper face, with which mesh the teeth 69 of a lever 70, pivoted at 71 in a cap 72 bolted to the casing and connected at its other end to a foot-pedal or the like (not shown) in convenient position for the driver to actuate.

Clutch 60 is set far enough back of clutch 30, on which it is secured, so that, when the latter is advanced in its normal position of engagement with clutch 20, clutch 60 will not engage clutch 61, but the latter can be slid forward, by the means just described, to engage it with clutch 60, even when the latter is in its retracted position.

A latch device (not shown) will be provided to hold clutch 61 in engagement with 60, until the forward movement of clutch 30, into engagement again with clutch 20, forces clutch 61 back, when the latch releases it and a spring, which may be mounted on the pivot 64, as indicated at 74, retracts clutch 61 to the position shown.

Having thus described my invention what I claim is:—

1. In a mechanism of the class described, the combination with a driving shaft and a member to be driven thereby, of an over-riding clutch connecting the same, a driving gear mounted on said shaft so as to be capable of a limited turning movement thereon, a second clutch to connect said member to said shaft, and connections between said gear and said second clutch such that the latter is thrown into and out of engagement by the said turning movement of the gear.

2. In a driving mechanism for motor vehicles, the combination with the wheel shafts and the power shaft, of automatic means for connecting the latter to both the wheel shafts for forward drive, and means, operated automatically by the reversal of the power shaft, to connect one only of the wheel shafts thereto for reverse drive.

3. In a driving mechanism for motor vehicles, the combination with the wheel shafts and the driving shaft, of means connecting the wheel shafts to said driving shaft for forward drive while permitting either wheel shaft to turn faster than said shaft, a driving gear mounted on said driving shaft so as to have a limited turning motion thereon, a clutch for connecting one only of the wheel shafts to said driving shaft for reverse drive, and connections between said gear and said clutch whereby the latter is thrown into engagement when the gear is reversed or the shaft runs faster than the gear.

4. A driving mechanism for motor vehicles, comprising the combination, with the fixed hollow axle of the vehicle, of a hollow driving shaft journaled therein, a driving gear having a limited turning movement on said shaft, overriding clutches connecting said shaft to the wheels, a reverse clutch member slidably keyed within said shaft, a coöperating clutch member connected to one of the wheels, and connections whereby the turning movement of the gear on the shaft slides said clutch member into and out of engagement.

5. A driving mechanism for motor vehicles, comprising a driving shaft, ratchet clutches connecting the same to the wheels for forward drive, a driving gear mounted on said shaft and capable of a limited turning movement thereon, and additional means to clutch said shaft to one of the wheels on reverse drive, said means being automatically thrown into and out of operative position by the said turning movement of the gear on the shaft.

6. A driving mechanism for motor vehicles, comprising a hollow driving shaft, a driving gear mounted to have a limited turning movement thereon, ratchet clutches connecting said shaft to the wheels for forward drive, an additional clutch member within said hollow shaft and connected to one of the wheels, a coöperating clutch member keyed to and movable longitudinally of said shaft, and means connecting said movable clutch member to said gear, such that it is automatically moved into and out of engagement by the turning movement of said gear on the shaft.

7. In a driving mechanism for motor vehicles, the combination of a hollow driving shaft adapted to be supported between and in alinement with the wheel shafts of the vehicle, headed shafts journaled in the ends of said driving shaft and having angular sockets for the reception of the ends of the wheel shafts, ratchet clutch teeth formed on the inner faces of the heads of said headed shafts, clutch members, provided with coöperating clutch teeth, non-rotatably but slidably mounted on the ends of the driving shaft, springs to hold said clutch members with their teeth in engagement with those of said heads, said clutches serving for the forward drive, a driving gear mounted on said driving shaft so as to have a limited turning movement thereon, said shaft being slotted within the hub of said gear, a lug in said hub passing through said slot, and means within the driving shaft to connect it to one of said headed shafts for reverse drive, said means being so constructed and arranged that said lug holds it disconnected during forward drive.

8. In a driving mechanism for motor vehicles, the combination of a hollow driving shaft adapted to be supported between and in alinement with the wheel shafts of the vehicle, headed shafts journaled in the ends of said driving shaft and having angular sockets for the reception of the ends of the wheel shafts, coöperating ratchet clutch members on said headed shafts and on the ends of said driving shaft, respectively, whereby the wheel shafts are positively driven forwardly but either wheel can overrun the other, reverse clutching teeth formed on the inner end of one of said headed shafts, a coöperating movable toothed member carried by the driving shaft, a driving gear mounted on said driving shaft so as to have a limited turning movement thereon, said shaft being slotted within the hub of said gear, and a lug in said hub passing through said slot, the turning movement of said gear on the driving shaft causing said lug to move and hold said member out of engagement during forward drive.

9. A driving mechanism for motor vehicles, comprising a single driving gear, a through shaft on which the same is mounted, connections between said shaft and the vehicle wheels operative on forward drive, and an independent connection between said shaft and one only of the wheels, operative on reverse drive.

10. A driving mechanism for motor vehicles, comprising a single driving gear, a hollow through shaft on which the same is mounted so as to have a limited turning movement thereon, connections between said shaft and the vehicle wheels, operative on forward drive, and an independent connection between said shaft and one only of the wheels for reverse drive, said last mentioned connection being mounted within said shaft and being automatically controlled by the turning movement of the gear on the shaft.

11. A driving mechanism for motor vehicles, comprising a single driving gear, a through shaft on which the same is mounted so as to have a limited turning movement thereon, clutch connections, operative on forward drive only, between said shaft and the vehicle wheels, an independent clutch connecting said shaft to one only of the wheels for reverse drive, said clutch being engaged and disengaged by said turning movement of the gear on the shaft, and means, carried by said clutch, to disengage the connection between said shaft and the other wheel when said clutch is in engagement.

12. A driving mechanism for motor vehicles, comprising a driving shaft, a driving gear thereon, ratchet clutches to connect said shaft to the wheels for forward drive, an independent clutch to connect one of the wheels to said shaft for reverse drive, connections between said gear and said independent clutch whereby the latter is automatically thrown in and out when the power is reversed, and a manually operated clutch for connecting the other wheel also to said shaft for reverse drive.

13. A driving mechanism for motor vehicles, comprising a driving shaft, a driving gear thereon, ratchet clutches to connect said shaft to the wheels for forward drive, an independent clutch to connect one of the wheels to said shaft for reverse drive, connections between said gear and said independent clutch whereby the latter is automatically thrown in and out when the power is reversed, a manually operated clutch for connecting the other wheel also to said shaft for reverse drive, and means to automatically disengage said last mentioned clutch on forward drive.

14. In a driving mechanism for motor vehicles, the combination with the wheel shafts and the power shaft, of overrunning means for connecting the latter to the wheel shafts for forward drive, and means, operated automatically by the reversal of said power shaft, to connect one of the wheel shafts to said power shaft and entirely disconnect the other.

15. In a driving mechanism for motor vehicles, the combination of a driving shaft, a driving gear connected thereto to drive the same but so as to be capable of a limited turning movement independently of said shaft, overriding clutches connecting said shaft to the wheels for forward drive, an independent clutch for connecting one of the wheels to said shaft for reverse drive, and connections between said gear and independent clutch whereby independent relative movement between said gear and shaft causes said independent clutch to be thrown in or out.

16. In a driving mechanism for motor vehicles, the combination of a driving shaft, a driving gear connected thereto to drive the same but so as to be capable of a limited turning movement independently of said shaft, overriding clutches connecting said shaft to the wheels for forward drive, an independent clutch for connecting one of the wheels to said shaft for reverse drive, connections between said gear and independent clutch whereby independent relative movement between said gear and shaft ses said independent clutch to be thrown in or out, and connections whereby the movement of said independent clutch into engagement disengages the overriding clutch of the other wheel.

17. A compensating driving mechanism for motor vehicles, comprising the combination of a driving casing, two driven members therein having means to non-rotatably connect them to wheel shafts and provided with ratchet teeth, coöperating toothed members operatively connected with said casing and adapted to engage said ratchet teeth for forward drive, ratchet toothed mechanism also within said casing and adapted to be connected to one of said driven members for reverse drive, and means carried by said casing to disconnect said mechanism during the forward drive.

In testimony whereof I have hereunto set my hand.

JOHN D. ALLEN.